United States Patent [19]

Cwirzen

[11] 3,947,732

[45] Mar. 30, 1976

[54] CONNECTOR BLOCK FOR TELEPHONE CENTRAL OFFICE MAIN DISTRIBUTING FRAME

[75] Inventor: Casimir Cwirzen, Des Plaines, Ill.

[73] Assignee: Cook Electric Company, Morton Grove, Ill.

[22] Filed: July 26, 1974

[21] Appl. No.: 492,275

Related U.S. Application Data

[63] Continuation of Ser. No. 336,265, Feb. 27, 1973, abandoned.

[52] U.S. Cl. ............... 317/122; 174/72 A; 339/99 R
[51] Int. Cl.² ........................................... H02B 9/00
[58] Field of Search ............ 174/72 A; 317/99, 122, 317/113, 101 CC; 179/98; 339/99 R, 18, 217 S

[56] References Cited
UNITED STATES PATENTS

| | | | |
|---|---|---|---|
| 1,639,310 | 8/1927 | Richardson | 174/72 A |
| 2,777,893 | 1/1957 | De Rosso | 317/101 CC |
| 3,437,882 | 4/1969 | Cayzer | 317/101 CC |
| 3,518,611 | 6/1970 | Shores, Jr. | 317/122 |
| 3,660,728 | 5/1972 | Carter | 317/101 CC |
| 3,665,378 | 5/1972 | Hammell | 339/217 S |
| 3,761,771 | 9/1973 | Thompson | 317/122 |

Primary Examiner—Gerald P. Tolin
Attorney, Agent, or Firm—Mason, Kolehmainen, Rathburn & Wyss

[57] ABSTRACT

A connector block for interfacing incoming telephone lines to telephone central office switching equipment includes a generally rectangular elongated mounting panel having a plurality of sockets arranged in groups in horizontal rows and vertical columns across a major portion of the width of the panel. Each of the socket groups mounts a generally rectangular plug-in protector assembly in such a manner that the long side of the protector assembly is generally parallel to the horizontal rows of socket groups. Adjacent to and associated with each two rows of the socket groups is a group of cross-connect pin terminal holes. Integrally formed with the edge of the mounting panel adjacent the groups of cross-connect pin terminal holes is a fanning strip having a flange portion transversely extending from the panel through which flange portion extends a plurality of openings to permit access between the front and back of the panel.

16 Claims, 6 Drawing Figures

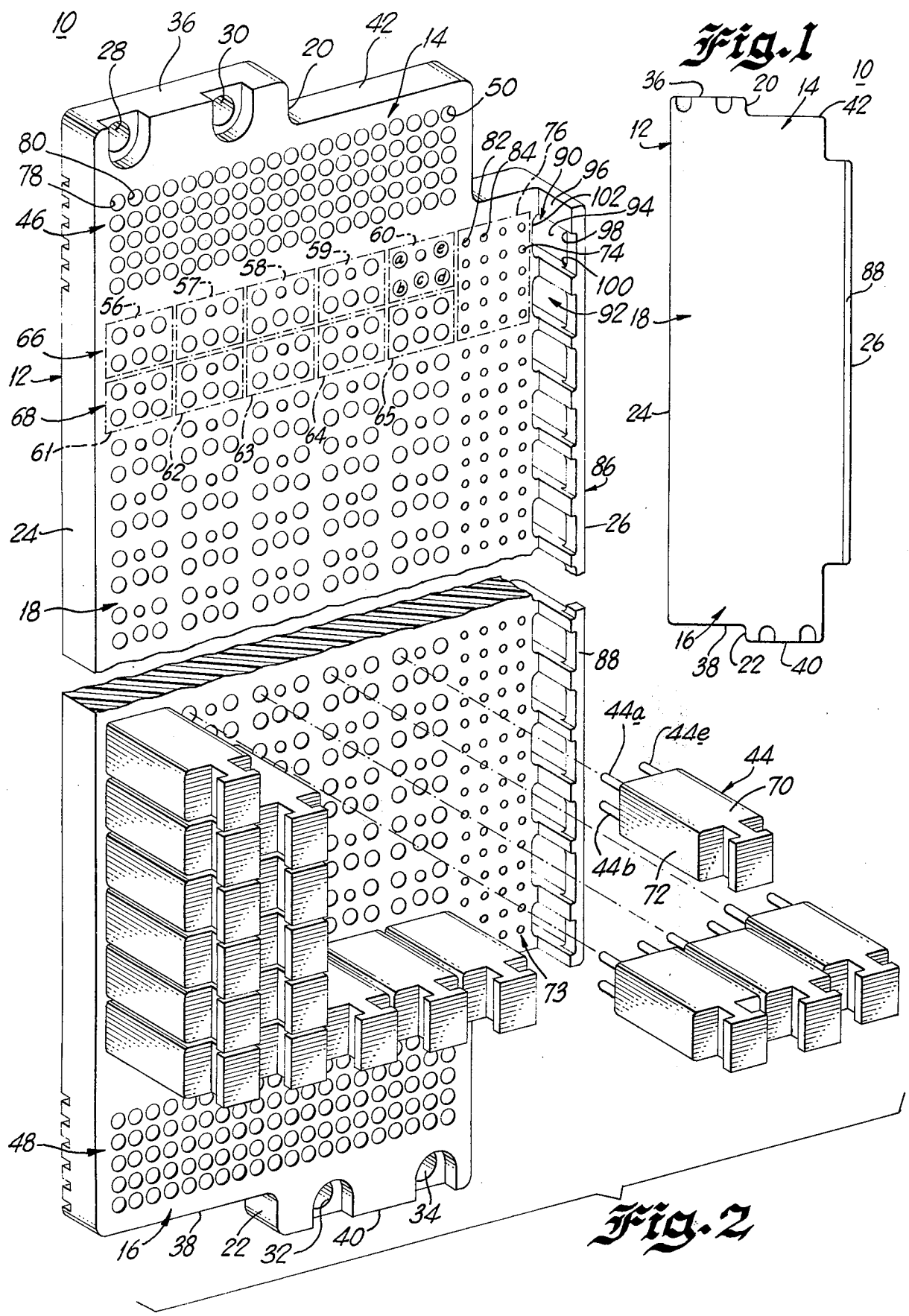

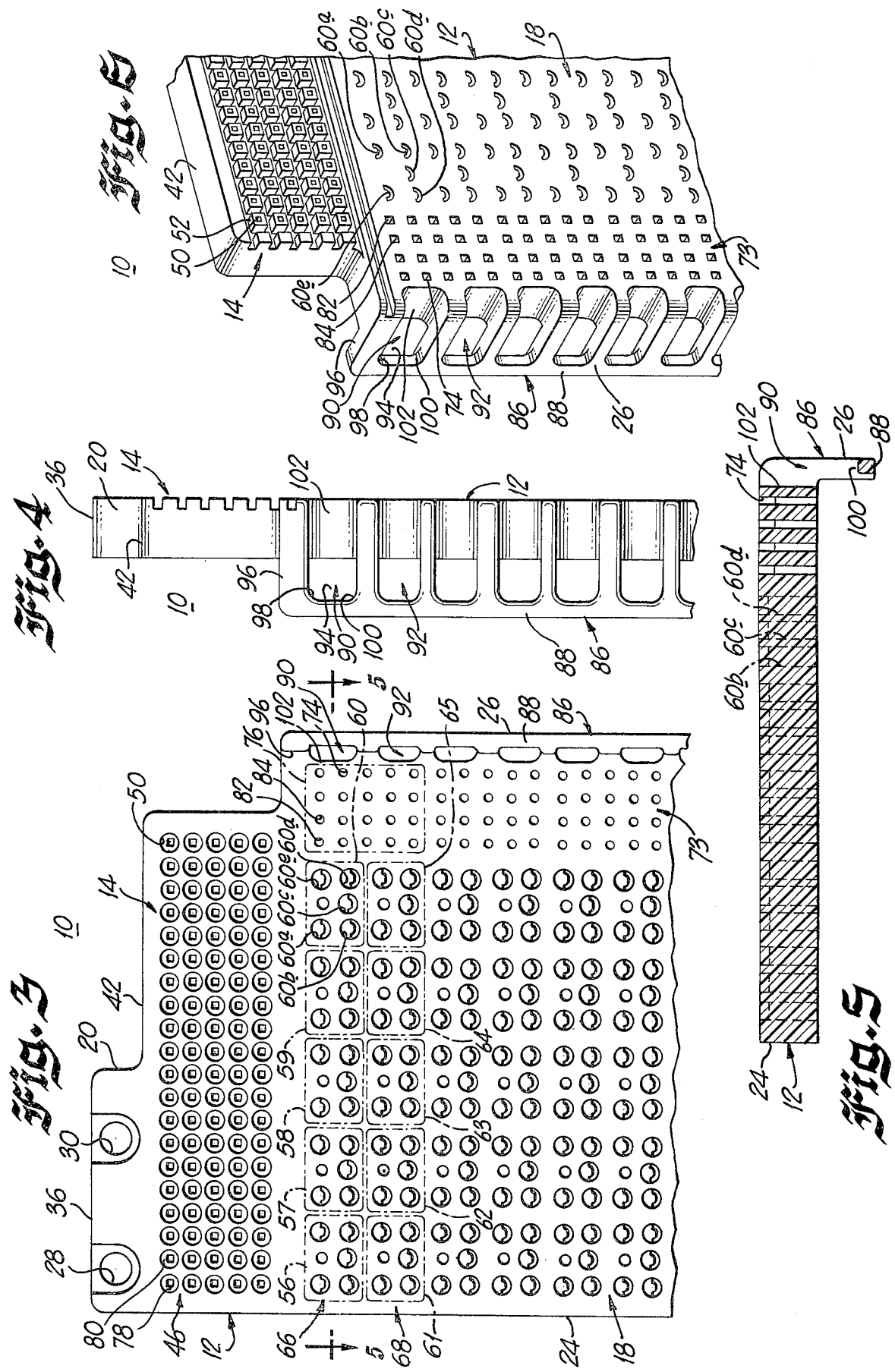

CONNECTOR BLOCK FOR TELEPHONE CENTRAL OFFICE MAIN DISTRIBUTING FRAME

The present application is a continuation application of patent application Ser. No. 336,265, filed on Feb. 27, 1973, and now abandoned.

This invention relates to a connector block for telephone central office main distributing equipment and, more particularly, to a new and improved connector block for mounting a plurality of plug-in protector assemblies in a minimum amount of space.

For each pair of incoming telephone lines to a telephone central office, a plug-in protector assembly is utilized to connect the pair of incoming lines to central office switching equipment. The protector assembly also protects the switching equipment from high voltage and current surges that might occur on the incoming lines. Typically, the protector assemblies are mounted on connector blocks so that the connector blocks form an electrical interface between the incoming telephone lines and the central office switching equipment. One such type of connector block is disclosed in U.S. Pat. No. 3,518,611.

The connector block disclosed in the aforementioned patent provides for the mounting of up to 100 such plug-in protector assemblies. Moreover, due to the specific geometric configuration of that connector block, cross-connect jumper wires utilized with the protector assemblies to connect the incoming lines to the central office switching equipment can be orderly and efficiently handled. However, the connector block of the type disclosed in the aforementioned patent occupies an undesirable amount of space. With the increasing number of incoming lines handled at each given central office, any decrease in the amount of space occupied by such connector blocks would be quite advantageous.

Accordingly, an object of the present invention is to provide a new and improved connector block for use as an electrical interface between incoming telephone lines and telephone central office switching equipment.

Another object of the present invention is to provide a new and improved connector block that occupies a minimal amount of space in a telephone central office.

Yet another object of the present invention is to provide a new and improved fanning strip for connector blocks.

Still another object of the present invention is to provide a new and improved connector block that mounts plug-in protector assemblies in a minimum amount of vertical space.

In accordance with these and many other objects, an embodiment of the present invention comprises a connector block for interfacing a plurality of incoming telephone lines to telephone central office switching equipment. The connector block has a generally elongated rectangular mounting panel with a plurality of sockets arranged in groups in rows and columns across a major portion of the width of the panel. Each of the socket groups is disposed on the panel so that a plug-in protector assembly mounted in the socket group will have its long side generally parallel to the rows formed by the socket groups. Also arranged in groups adjacent to the socket groups are a plurality of cross-connect pin terminal holes. Each group of pin terminal holes is disposed next to two rows of socket groups and is associated with the socket groups in the two rows. Along a vertical edge of the connector block and adjacent to the pin terminal holes is a fanning strip having a flange with a plurality of openings extending through the flange to receive cross-connect jumper wires that connect the protector assemblies to the central office switching equipment.

Many other objects and advantages of the present invention will become apparent from considering the following detailed description in conjunction with the drawings in which:

FIG. 1 if an outline illustrating the frontal configuration of a connector block embodying the present invention;

FIG. 2 is a partially cut away frontal perspective view of the connector block shown in FIG. 1;

FIG. 3 is a cut away rear view of the connector block shown in FIG. 2;

FIG. 4 is a side elevational view of the portion of the connector block shown in FIG. 3;

FIG. 5 is a cross-sectional view of the connector block shown in FIG. 3 taken along line 5-5 of FIG. 3; and FIG. 6 is a cut away perspective rear view of the connector block shown in FIG. 2.

Referring now more specifically to FIG. 1 of the drawings, therein is illustrated a connector block which is indicated generally as 10 and which embodies the present invention. The connector block 10 consists of a generally rectangular elongated mounting panel 12 having an upper end portion 14, a lower end portion 16, and an elongated middle section or area 18. The upper end portion 14 has a dovetail edge 20 whereas the lower end portion has a dovetail edge 22. The edge 22 is designed to engage with the edge 20 of another connector block 10 so that a number of connector blocks 10 can be mounted vertically on top of each other to form a telephone central office distributing main frame. By minimizing the amount of vertical space occupied by the mounting panel 12 between the end portions 14 and 16 and by minimizing the width of the mounting panel 12 between vertical or elongated edges 24 and 26, the number of connector blocks 10 that can be disposed in a given telephone central office is advantageously increased.

As illustrated in FIGS. 2 and 3 of the drawings, the upper end portion 14 has a pair of mounting holes 28 and 30 and the lower end portion 16 has a pair of mounting holes 32 and 34. The mounting holes 28, 30, 32, and 34 are positioned on the connector block 10 so that the holes 28, 30, 32, and 34 are alignable with holes on a bracket nesting in the telephone central office and the connector block 10 is securable to the bracket nesting by bolts or the like extending through the holes 28, 30, 32, and 34. When so disposed on the bracket nesting, a projecting edge portion 36 of the edge 20 engages in abutting relationship with a recessed edge portion 38 of the edge 22 of another connector block positioned above the connector block 10 on the bracket. Similarly, a projecting edge portion 40 of the edge 22 is designed to engage in abutting relationship with a recessed edge portion 42 of the edge 20 of another connector block 10 that is mounted directly below the connector block 10 on the bracket nesting. In this manner, the various connector blocks 10 are properly and securely mounted on the bracket nesting.

In the disclosed embodiment of the connector block 10, each of 100 pairs of incoming telephone lines is coupled to the telephone central office switching equipment by one of a plurality of plug-in protector assemblies 44. Each of the 200 incoming telephone lines is coupled to a pin terminal that is mounted in one of 100 field test holes 46 in the upper end portion 14 of the mounting panel 12 and one of 100 field test holes 48 in the lower end portion 16. As illustrated in connection with field test hole 50, each of the field test holes 46 and 48 is round and extends from the front of the connector block 10 through a portion of the upper end portion 14. As best seen in FIGS. 3 and 6, the field test hole 50 becomes square shaped near the rear of the connector block 10 and extends through a generally square terminal block 52 projecting from the rear of the end portion 14. An incoming telephone line associated with the field test hole 50 is coupled to a pin terminal that is insertable into the field test hole 50 through the terminal block 52. Test equipment or the like can be inserted into the field test hole 50 from the front of the connector block 10 and coupled to the incoming telephone line associated with the field test hole 50 for testing or the like.

The middle section 18 of the mounting panel 12 extends between the upper end portion 14 and the lower end portion 16. A plurality of pin-grip connector holes or sockets are located adjacent the edge 24 and extend across a major portion of the middle section 18. The sockets are arranged in groups, such as socket groups 56–65, in horizontal rows and vertical columns. The socket groups 56–60 form a first or top row 66 in the middle section 18. Similarly, the socket groups 61–65 form a second row 68 directly below the row 66. In the disclosed embodiment, 100 protector assemblies 44 are mounted in the socket groups arranged in 20 rows and 5 columns.

As illustrated in connection with the socket group 60, each of the socket groups 56–65 has five receiving holes or sockets 60a–e, which have a round portion extending through a substantial portion of the mounting panel 12. Near the rear of the connector block 10 and as best seen in FIGS. 5 and 6, each of the holes 60a–e narrows and becomes generally U-shaped. The U-shaped portion of the holes 60a–e extends through the rear of the mounting panel 12 (FIG. 6). Appropriate connectors are insertable into the holes 60a–e.

The holes 60a–e, with the connectors therein, are designed to receive corresponding pins 44a–e (44c and 44d are not shown) of one of the protector assemblies 44. As best seen in FIG. 2, when the pins 44a–e are inserted into the holes 60a–e, the protector assembly 44 has a long side 70 disposed in a horizontal direction along and generally parallel to the row 66. Another or a short side 72 of the protector assembly 44 is positioned vertically or along the vertical columns of socket groups. With the long side 70 of the protector assembly 44 mounted on the connector block 10 in a horizontal direction rather than a vertical direction, the amount of vertical space occupied by the protector assemblies 44 on the connector block 10 is advantageously decreased.

Adjacent the rows and columns of socket groups is a plurality of cross-connect pin terminal holes 73. Each of the cross-connect pin terminal holes 73, such as cross-connect pin terminal hole 74, is generally round and extends through a substantial portion of the connector block 10. As best seen in FIGS. 5 and 6, near the rear of the connector block 10, the cross-connect pin terminal hole 74 becomes generally square-shaped and extends through the rear of the connector block 10.

The cross-connect hole 74 receives a cross-connect pin terminal (not shown) which extends through the hole 74 from both the rear and front sides of the connector block 10. As described in more detail hereinafter, the cross-connect pin terminal enables each of the protector assemblies 44 to be coupled to the telephone office switching equipment by appropriate cross-connect jumper wires.

The pin terminal holes 73 are arranged alongside of the socket groups and in groups of twenty holes. One such group of cross-connect pin terminal holes is group 76. The group 76 is disposed adjacent the rows 66 and 68 and is associated with the protector assemblies 44 mounted in the rows 66 and 68 enabling minimization of vertical space occupied by the cross-connect pin terminal holes 73.

More specifically, in previously designed connector blocks, a group of ten pin terminal holes was associated with each row of socket groups and contained three rows of pin terminal holes. Thus, each two rows of socket groups required six rows of pin terminal holes. On the other hand, the group 76 is associated with the two rows 66 and 68 and only contains five rows of cross-connect pin terminal holes for the two rows 66 and 68. Accordingly, the vertical space on the mounting panel 12 occupied by the cross-connect pin terminal holes 73 is minimized and permits the mounting of the short side 72 of each of the protector assemblies 44, rather than the long side 70, along the vertical columns of socket groups on the mounting panel 12. In this manner, the same amount of the protector assemblies 44 can be mounted on the connector block 10 that were mounted on previously used connector blocks, but in a lesser vertical space.

As previously indicated, the connector block 10 serves as an interface between incoming telephone lines and the central office switching equipment. For example, an incoming telephone line is associated with each of the field test holes 46, such as holes 78 and 80. A jumper wire (not illustrated) extending along the rear of the connector block 10 from the field test hole 78 to the socket group 56 couples the incoming telephone line associated with the field test hole 78 to the pin 44a of the protector assembly 44 mounted in the socket group 56. The pin 44a is internally coupled in the protector assembly 44 to the pin 44b. A cross-connect jumper cable or wire extending along the rear of the connector block 10 from the socket group 56 couples the pin 44b to a cross-connect pin terminal extending from the rear of a cross-connect pin terminal hole 82 in the group 76. Likewise, a jumper wire couples the incoming telephone line associated with field test hole 80 to the pin 44e which is internally coupled in the protector assembly 44 mounted in the socket group 56 to the pin 44d. The pin 44d is in turn coupled by a cross-connect wire to the pin terminal mounted in a pin terminal hole 84 in the group 76. Thus, each pair of incoming telephone lines associated with two of the field test holes 46 or 48 are coupled through one of the protector assemblies 44 to a pair of cross-connect pin terminals mounted in cross-connect pin terminal holes 73.

In order for the protector assembly 44 to protect the central office switching equipment from high voltages or current surges on the incoming lines, the pins 44a and 44b are coupled to the pin 44c via an arrester disposed in the protector assembly 44. Similarly, the pins 44d and 44e are coupled to the pin 44c via a second arrester in the protector assembly 44. The pin 44c is grounded by means of an appropriate bus terminal or jumper wire. Thus, if a high voltage or current surge occurs on either of the incoming lines coupled to the pins 44a and 44e, the arrester associated with the pin 44a or 44e will short out and couple the pin 44a or 44e to ground and the central office switching equipment is protected.

Once the incoming lines are coupled to the cross-connect pin terminals in the holes 73, jumper wires couple to the central office switching equipment the cross-connect pin terminals extending from the front of the connector block 10. The jumper wires normally extend along the rear of the connector block 10. In order to gain access to the front of the connector block 10 from the rear thereof, a fanning strip 86 is formed along the elongated edge 26 of the mounting panel 12.

To minimize the horizontal space occupied by the fanning strip 86, the fanning strip 86 consists of a relatively narrow flange or projecting strip 88 transversely extending generally perpendicularly from the front of the mounting panel 12. The flange 88 has a plurality of openings, such as openings or apertures 90 and 92, extending along the flange 88 and the edge 26 of the connector block 10 to allow access between the front and rear sides of the connector block 10. Each two openings, such as the openings 90 and 92, are adjacent to a cross-connect pin terminal group, such as the group 76, so that the jumper wires are not only protected from adjacent connector blocks by the flange 88, but also are easily grouped together. For example, the jumper wires coupling the protector assemblies 44 in the row 66 to the telephone office switching equipment extend through the opening 90 whereas the jumper wires associated with the protector assemblies 44 in the row 68 extend through the opening 92.

Each of the openings 90 and 92 has a generally rectangular opening 94 in a portion 96 of the flange 88 that extends out from the front side of the panel 12. The rectangular opening 94 has generally rounded corners, such as corners 98 and 100, to ensure that the jumper wires are not damaged during installation. The rectangular opening 94 connects with a recess 102 in the side or edge 26 of the panel 12 so that the jumper wires can extend from the front side of the panel 12 to the rear side of the panel 12.

Advantageously, the flange type of fanning strip 86 occupies a minimal amount of horizontal space and the width of the connector block 10 is minimized. In particular, the utilization of the connector block 10 enables the effective area occupied by the connector block 10 to be almost 15 percent less than previously utilized connector blocks.

Although the present invention is described with reference to a single illustrative embodiment thereof, it should be understood that numerous other modifications and embodiments of the invention can be devised by those skilled in the art that will fall within the spirit and scope of the principles of this invention.

What is claimed and desired to be secured by Letters Patent of the United States is:

1. A connector block for telephone distributing equipment comprising:
    an elongated mounting panel having front and rear panel faces and first and second elongated edges,
    a plurality of sockets in said panel arranged in groups so as to form a plurality of socket groups, said socket groups being arranged in a plurality of rows and columns on said panel,
    a plurality of terminal holes in said panel positioned adjacent said rows and columns of socket groups, said terminal hoeles being arranged in terminal hole groups adjacent said socket groups,
    a fanning strip disposed along said first edge of said panel and including a flange extending forward beyond said front panel face and an edge portion extending toward said rear face from said front face, and
    a plurality of apertures defined in said fanning strip, each aperture extending from the front face toward the rear face of the panel in said edge portion and extending laterally through said flange from the front face to the side of said panel.

2. The connector block as set forth in claim 1 wherein each of said sockets has a round portion extending from the front panel face of the mounting panel through a substantial portion of the mounting panel and a generally U-shaped portion extending through the rear panel face of the mounting panel.

3. The connector block as set forth in claim 1 wherein each of said terminal holes has a round shaped portion near said front panel face of said mounting panel and a generally square shaped portion near said rear panel face of said mounting panel.

4. The connector block as set forth in claim 1 including five socket groups in each of said rows, 20 socket groups in each of said columns, and twenty terminal holes in each of said terminal hole groups.

5. The connector block as set forth in claim 1 wherein each two adjacent apertures are associated with one of the terminal hole groups.

6. A connector block as set forth in claim 1 wherein each of said terminal hole groups is positioned adjacent two of said rows of socket groups so as to be associated with the socket groups in said two rows.

7. A connector block as set forth in claim 1 wherein said panel and said flange are one integral piece.

8. A connector block as set forth in claim 1 including a plurality of protector modules of the type having a pair of opposed long sides and a pair of opposed short sides wherein one of said protector modules is received in each of said socket groups such that said long sides are generally parallel to said rows and said short sides are generally parallel to said columns.

9. A connector block for telephone distributing equipment comprising:
    a generally elongated mounting panel having first and second opposed panel sides, and first and second elongated edges between said first and second opposed panel sides,
    a plurality of holes in said panel arranged in a plurality of first hole groups, said first hole groups being arranged in rows and columns on said panel,
    a plurality of terminal holes disposed between one side of said rows and columns of said first hole groups and said first elongated edge of said panel, said terminal holes being arranged in a plurality of second hole groups,
    a fanning strip disposed adjacent said terminal holes, said fanning strip having a projecting portion extending from the first panel side and an edge portion extending along said first elongated edge, and
    a plurality of openings formed in said fanning strip, each of said openings extending from said first panel side in said projecting portion and extending from said first panel side toward said second panel side in said edge portion and including a recess in said first elongated edge.

10. The connector block as set forth in claim 9 including a plurality of field test holes extending through an upper end portion and a lower end portion of said panel, each of said field test holes having a generally circular shaped portion near said first panel side that extends into a generally square shaped hole in a generally square shaped block projecting from the second panel side.

11. The connector block as set forth in claim 9 wherein each of said second hole groups is positioned adjacent two adjacent rows of first hole groups.

12. A connector for mounting a plurality of generally rectangular plug-in protector assemblies having a pair of opposed long sides and a pair of opposed short sides that couple incoming telephone lines to telephone equipment, said connector comprising:
- an elongated mounting panel having a pair of faces and a pair of elongated side edges,
- a plurality of sockets arranged in socket groups in rows and columns in the mounting panel, each of said socket groups being capable of mounting one of said protector assemblies such that said long sides are generally parallel to said rows and said short sides are generally parallel to said columns,
- a plurality of terminal holes disposed adjacent said socket groups,
- a fanning strip disposed adjacent said terminal holes at one of said elongated side edges, said fanning strip having a projecting portion extending from one of said faces of said panel, and
- a plurality of openings in said fanning strip, each of said openings extending from said face of said panel in said projecting portion and including a recess in one of said elongated side edges extending between said pair of faces.

13. A connector as set forth in claim 12 wherein said projecting portion projects from said face in a direction substantially perpendicular to the plane of said panel.

14. A connector block for telephone distributing equipment comprising:
- a generally elongated mounting panel having first and secnd opposed panel sides, and first and second elongated edges between said first and second opposed panel sides,
- a plurality of holes in said panels arranged in a plurality of first hole groups, said first hole groups being arranged in rows and columns on said panel,
- a plurality of terminal holes disposed between one side of said rows and columns of said first hole groups and said first elongated edge of said panel, said terminal holes being arranged in a plurality of second hole groups,
- a fanning strip to provide access between said first and second panel sides, said fanning strip having a projecting portion extending from said first panel side away from said second panel side and having an edge portion disposed on said first edge between said first and second panel sides, and
- a plurality of openings formed in said fanning strip to provide said access between said first and second panel faces, each of said openings extending into and through said edge portion into and through said projecting portion.

15. A connector block for telephone distributing equipment comprising:
- a generally elongated mounting panel having first and second opposed panel sides, and first and second elongated edges between said first and second opposed panel sides,
- a plurality of holes in said panels arranged in a plurality of first hole groups said first hole groups being arranged in rows and columns on said panel,
- a plurality of terminal holes disposed between one side of said rows and columns of said first hole groups and said first elongated edge of said panel, said terminal holes being arranged in a plurality of second hole groups,
- a fanning strip integrally formed with said mounting panel and disposed at and along said first edge, said fanning strip has a flange portion extending out from and transversely from said first panel side,
- a plurality of openings formed in said fanning strip and said panel, each of said openings extends through said panel from said first side to said second side and through said flange portion.

16. A connector block for telephone distributing equipment comprising:
- a generally rectangular mounting panel having front and rear sides and a pair of opposed edge portions extending between said front and rear sides,
- a plurality of sockets in said panel arranged in groups in a plurality of rows and columns on said panel,
- a plurality of groups of terminal holes in said panel positioned adjacent said rows and columns of socket groups,
- a flange end portion projecting transversely from the panel along one edge portion of said panel, and
- a plurality of openings extending along said flange portion and in said one edge portion of said panel to permit access between the front and rear sides of said panel.

* * * * *